Aug. 6, 1935.  G. L. MATHESON  2,010,435
FILTRATION APPARATUS AND METHOD
Filed April 8, 1933   2 Sheets-Sheet 1

George L. Matheson Inventor
W. E. Currie Attorney

Aug. 6, 1935.　　　G. L. MATHESON　　　2,010,435
FILTRATION APPARATUS AND METHOD
Filed April 8, 1933　　2 Sheets-Sheet 2

George L. Matheson Inventor
By W. E. Currie Attorney

Patented Aug. 6, 1935

2,010,435

UNITED STATES PATENT OFFICE 2,010,435

FILTRATION APPARATUS AND METHOD

George L. Matheson, Elizabeth, N. J., assignor to Standard Oil Development Company, a corporation of Delaware Application April 8, 1933, Serial No. 665,111

8 Claims. (Cl. 210—43)

This invention relates to improvements in methods and apparatus adapted for use in filtering liquids, especially oil circulating in the lubricating system of an internal combustion engine, turbine, or other machine. A primary purpose of the invention is to improve the efficiency of filtration by subjecting the oil in two stages to purification, all the oil passing through the first stage, while a small part only passes through the second stage. The circulation is so adjusted that all the oil passes on the average through the second stage in some predetermined time, for example one hour.

In a preferred form of the invention, the desired purpose is accomplished by passing all the oil first through a centrifugal separating stage wherein any solid particles of substantial size are removed and then passing a fraction of the oil so purified through a filter adapted to remove small particles of suspended matter, with or without an intermediate stage for removing the centrifugally separated particles.

At present it is customary to use one of two types of automobile filters. Either the total volume of oil is forced through a filter composed of fabric leaves or the like, or a small portion only of the oil is filtered through a mass of fibrous material while the remainder of the oil goes without filtration through the lubricating system. A single filtration of all the oil does not in general give as good purification as filtration of a part only in a by-pass filter. On the other hand, where only part of the oil is filtered it may be that abrasive particles will enter the lubricating system. According to the present invention the disadvantages of both these systems are avoided by the use of a combination of filtering means.

The invention will be fully understood from the following description read in connection with the accompanying drawings in which Fig. 1 is a diagrammatic vertical section through a preferred form of filter;

Figure 1:
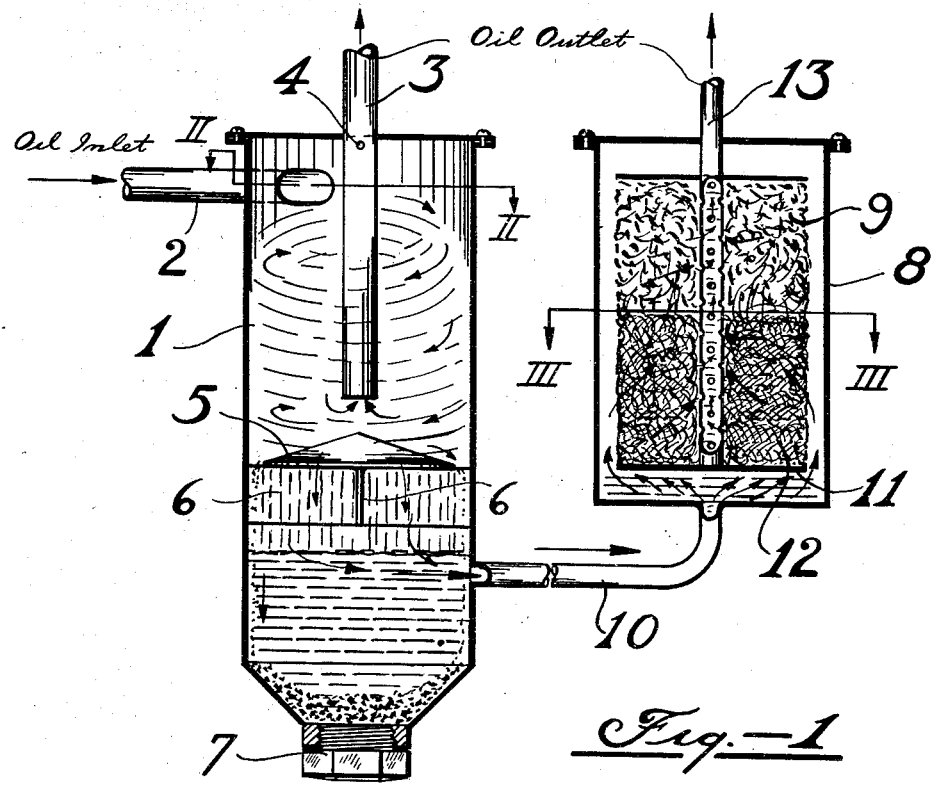
Figures 2, 3:
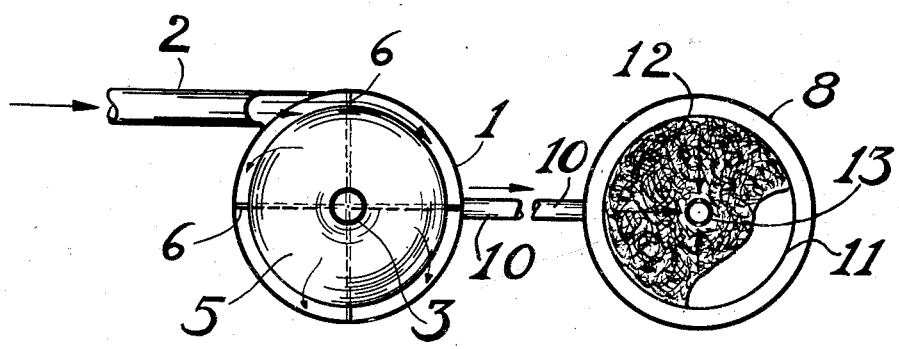
Fig. 2 is a transverse section on line II—II of Fig. 1.
Fig. 3 is a transverse section on line III—III of Fig. 1.
Figure 4:
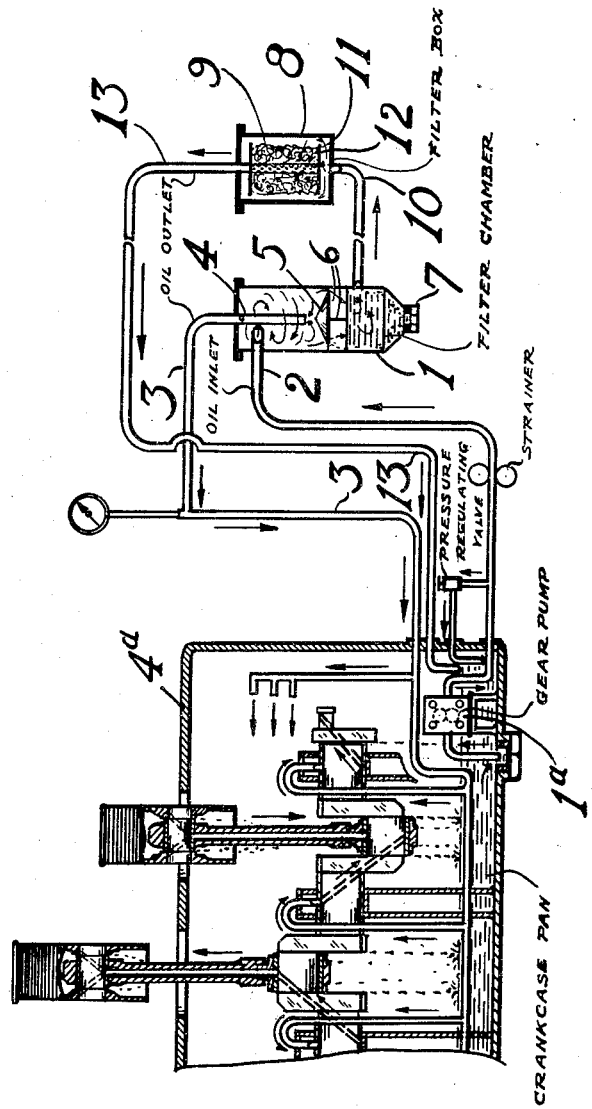
Fig. 4 is a symmetric representation in side elevation showing the photo-structure in operative position with respect to the crankcase.

Referring to the drawings, and for example to the use of the invention in an automobile lubricating system, reference numeral 1 denotes a filter chamber which may be in the form of an elongated cylinder. All the oil which comes from the engine pump 1A passes through a pipe 2 discharging tangentially near the top of the chamber 1. A discharge pipe 3 is arranged centrally in the chamber 1 and extends to a point near its middle. A small perforation 4 is made in the upper part of pipe 3 and air is vented through this perforation. The pipe 3 leads to a crankcase 4A.

In the middle part of chamber 1 there is a conical spreading plate 5 suitably mounted as on vertical baffles 6. The conical plate receives the oil discharged from tangential pipe 2 and swirling around the chamber 1. The plate 5 deflects any solid particles to the wall of the chamber. The baffles 6 stop the swirling of the oil, thus facilitating the settling of the solid particles. These particles flow with the oil which is to be further filtered into the bottom of filter chamber 1. This has a removable closure, for example a screw plug 7, which is taken off when the collected sediment should be removed.

The oil separated from the larger of the solid particles that it may have contained is then passed in part to a by-pass filter box 8. This may be of any suitable type but is preferably a cylinder packed with slag wool 9 as described in application Ser. No. 598,092 of G. M. Maverick and G. L. Matheson, filed March 10, 1932. This type of purification by fibrous materials is referred to herein as contact purification or filtration. The present invention is not limited to the use of any particular kind of filter for the by-passed oil. This oil flows by pipe 10 around the bottom plate 11, through the fibrous filter 12, and out through pipe 13 to the crankcase.

In the preferred way of operating this invention, the sizes of the pipes and containers are so adjusted that about 90% of the oil passes to the bearings after having been subjected only to the centrifugal separation in chamber 1. This 90% leaves the filter chamber by pipe 3. The remaining 10% passes for further purification to the filter box 8 as described, and thence to the crankcase. It will be seen that any small particle, as of sand or metal, which may pass the pump, will be thrown out of the oil in chamber 1. The 90% of oil which leaves this chamber is sufficiently purified for original use. It will within a reasonable period be circulated through the filter box 8 for further purification.

The sediment collecting chamber is conveniently made a part of the filter, as shown, but may be separate, or this chamber may be dispensed with entirely in some cases. The contact filter will then catch the larger particles as well as the smaller.

The foregoing description is merely illustrative of preferred forms of the invention and various changes and alternative arrangements may be made within the scope of the appended claims, in which it is my intention to claim all novelty inherent in the invention as broadly as the prior art permits.

I claim:

1. Method of filtering oil in an automobile crankcase, comprising passing substantially all the oil into a centrifugal separating stage, taking off a major part of the oil from such stage, passing the residual oil into a contact separating stage, and withdrawing the oil from such stage.

2. Method according to claim 1, in which the solid particles separated in the centrifugal stage are removed before the oil enters the contact stage.

3. Method of filtering oil in an automobile crankcase, comprising passing all the oil into a centrifugal separating stage, wherein any solid particles of substantial size are separated, taking off about 90% of the oil from such stage and passing it to the bearings, passing the residual 10% of the oil through a fibrous filtering mass, and withdrawing the oil from said mass to the crankcase.

4. The method of purifying oil in an automobile crankcase, comprising passing all of the oil into a centrifugal separating stage wherein any solid particles of substantial size are segregated in the oil, taking off the oil from said stage and passing it to bearings, filtering the residual smaller portion of the oil containing the solid particles, and withdrawing the filtered oil directly to the crankcase.

5. In an apparatus for filtering oil, the improvement which comprises means for first subjecting the entire body of oil to centrifugal force to segregate larger particles in the oil, means for quieting the portion of the oil containing the segregated particles to permit settling of the particles in the oil, means then subjecting that portion of the oil to contact filtration, and means for separately withdrawing the other portion of oil free from particles from the centrifuging means.

6. Apparatus for filtering oil in an automobile crankcase, comprising a centrifugal separator, means for passing the entire volume of oil through the separator to segregate solid material in the oil, a contact filter, means for passing the portion of the oil containing the segregated solid material through the contact filter and thence to the crankcase, automobile bearings, and means for passing the unfiltered portion of the oil from the centrifugal separator to the bearings and thence to the crankcase.

7. Filtering apparatus for liquid, comprising a stationary cylindrical tank, an ingress pipe arranged to give the liquid in the upper portion of the tank a whirling motion whereby solid particles are segregated in the liquid, means for preventing whirling of the liquid in the lower portion of the tank whereby the separated solid particles settle, an egress pipe extending down into the upper portion of the tank, a second egress pipe of lesser diameter than the first mentioned egress pipe leading from the tank below the means, and a contact filter in the second egress pipe.

8. Filtering apparatus for liquid, comprising a cylindrical tank, an ingress pipe arranged to give the liquid in the upper portion of the tank a whirling motion whereby solid particles are segregated in the liquid, means including a baffle plate for preventing whirling of the liquid in the lower portion of the tank whereby the separated solid particles settle, an egress pipe extending down into the upper portion of the tank, a second egress pipe of lesser diameter than the first mentioned egress pipe leading from the tank below the baffle plate for conducting off the liquid containing the separated particles, and a contact filter in the second egress pipe.

GEORGE L. MATHESON.